(12) United States Patent
Michl

(10) Patent No.: US 8,189,490 B2
(45) Date of Patent: May 29, 2012

(54) MESSAGE ANALYZER AND ANALYSIS METHOD

(75) Inventor: Andreas Michl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 543 days.

(21) Appl. No.: 10/567,474

(22) PCT Filed: Jul. 28, 2004

(86) PCT No.: PCT/EP2004/008461
§ 371 (c)(1),
(2), (4) Date: Feb. 3, 2006

(87) PCT Pub. No.: WO2005/018153
PCT Pub. Date: Feb. 24, 2005

(65) Prior Publication Data
US 2008/0151760 A1    Jun. 26, 2008

(30) Foreign Application Priority Data
Aug. 5, 2003 (DE) ................................ 103 35 811

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................... 370/252; 370/241; 370/474

(58) Field of Classification Search ............ 370/241, 370/252, 474
See application file for complete search history.

(56) References Cited

U.S. PATENT DOCUMENTS

| 5,732,213 A | 3/1998 | Gessel et al. |
| 5,740,355 A | 4/1998 | Watanabe et al. |
| 5,847,972 A | 12/1998 | Eick et al. |
| 5,850,388 A | 12/1998 | Anderson et al. |

(Continued)

FOREIGN PATENT DOCUMENTS

DE          10204657          8/2003

(Continued)

OTHER PUBLICATIONS

PCT/EP2004/008461, International Preliminary Report on Patentability.

*Primary Examiner* — Jae Y Lee
(74) *Attorney, Agent, or Firm* — Ditthavong Mori & Steiner, P.C.

(57) ABSTRACT

A message analysis device serves for the analysis of messages transmitted via service access points on layers of an OSI reference model. The message analysis device comprises a storage device, for storing messages, a selection device, for reading a series of sequential messages and a display device, for the display of at least one first region and one second region. In the first region, a series of messages read by the selection device from the memory device can be displayed as a list. The selection device determines a characteristic feature of messages for at least one service access point, transmitted by the service access point, whereby the curve for the characteristic feature may be displayed on the display device in the second region.

17 Claims, 5 Drawing Sheets

U.S. PATENT DOCUMENTS

| | | | |
|---|---|---|---|
| 5,867,483 A * | 2/1999 | Ennis et al. | 370/252 |
| 6,144,379 A * | 11/2000 | Bertram et al. | 715/835 |
| 6,356,256 B1 * | 3/2002 | Leftwich | 345/157 |
| 6,526,044 B1 | 2/2003 | Cookmeyer, II et al. | |
| 2002/0026247 A1 * | 2/2002 | Ikami | 700/1 |
| 2002/0100422 A1 * | 8/2002 | Hilliker | 118/723 I |
| 2002/0105911 A1 * | 8/2002 | Pruthi et al. | 370/241 |
| 2002/0156884 A1 | 10/2002 | Bertram et al. | |
| 2002/0186660 A1 * | 12/2002 | Bahadiroglu | 370/248 |
| 2002/0198985 A1 | 12/2002 | Fraenkel et al. | |

FOREIGN PATENT DOCUMENTS

| | | |
|---|---|---|
| GB | 2333672 | 7/1999 |
| WO | WO02/071779 A1 | 9/2002 |

* cited by examiner

Fig. 3

MESSAGE ANALYZER AND ANALYSIS METHOD

FIELD OF THE INVENTION

The invention relates to a message analyzer and a method for analyzing messages which are transmitted via service access points from layers of an Open Systems Interconnection (OSI) reference model.

BACKGROUND OF THE INVENTION

A message analyzer and a method for analyzing messages which are transmitted between the individual layers of the Open Systems Interconnection (OSI) reference model in the case of a communications system constructed according to the OSI reference model are described in the not prior published German Patent Application DE 102 04 657 Al.

This message analyzer thereby has means with which the causal relationship between individual messages from a chronologically listed sequence of all messages, irrespective of the respectively relevant layer of the OSI reference model, can be displayed. For this purpose, a supplementary item of information for each message which is transmitted is stored in each storage device during a test run, from which it can be determined by the analyzer, which messages were produced as a result of another message. Conversely, it is likewise possible to determine with respect to a specific message, which message is the cause of transmission of the specific subsequent message.

The selection of the message, for which preceding or subsequent messages which are in a causal relationship with the message are determined, is effected by means of selection of the message in a first region of a display device. In this first region of the display device, merely a limited number of messages can be displayed, the messages displayed respectively in the first region of the display device being displayed after reading in of the items of information from a storage device in table form. The arrangement of the items of information which are displayed in the first region is thereby effected on the basis of an item of time information which is stored for each individual message.

It is thereby disadvantageous that the number of messages displayed in the first region forms respectively only a small part of the entire number of messages which are stored in the storage device during a test run. In particular, a multiplicity of messages is displayed in the first region due to sorting of the messages on the basis of the item of time information, which messages can remain out with consideration during analysis of a test scenario since they are neither in a direct causal relationship with the remaining messages nor relate to the same layer of the OSI reference model.

SUMMARY OF THE INVENTION

There exists a need to provide a message analyzer and a method for analyzing messages in which an evaluation of a characteristic feature for a multiplicity of messages which are transmitted via one service access point is possible, without requiring all the information relating to all available messages to be read in by the message analyzer.

In accordance with one aspect of the present invention, in one embodiment, the messages stored in a storage device of a message analyzer are read in by means of a selector. Detailed information relating to individual messages is displayed in a first region of a display device by listing the messages in chronological sequence. It is advantageous that, by means of the selector, a characteristic feature is determined for a specific group of messages, namely all those messages which have been transmitted via a specific service access point. This characteristic feature can then be displayed as a course over a large number of messages in a second region of the display device and makes possible a rapid overview across a wide range of messages. Preferably the course of the characteristic feature for the entire number of messages stored in the storage device during a test run is determined.

Hence an evaluation with respect to a characteristic feature for a large group of messages is possible on the basis of the displayed course in the second region, the quantity of data read in by means of the selector being greatly reduced. The data transfer is restricted to reading in of information underlying the characteristic feature only of those messages which have been transmitted via one or more specific service access points and hence reduces the loading times.

It may be advantageous in one embodiment if, during the evaluation of the course of a characteristic feature of the messages transmitted via one specific service access point, additional items of information relating to a group of messages transmitted at a specific point in time are utilized, in that in order to display detailed information in the first region, a specific sequence of messages with all the items of information from the storage device are read in by means of the selector. A message is thereby established for the selector by means of a selection of a specific point in the second region, which message forms a reference point for the sequence of messages which are to be read in for display in the first region.

A further advantage, in one embodiment, is that, in the second region, a preselection of specific points can be made in that in the second region a specific point can be marked with a marking, the sequence of messages which corresponds to this specific point only being read in upon selection of the marking in the second region by means of the selector. In particular, if a plurality of such markings in the second region marks different specific points, a repeated exchange between the individual sequences which are to be displayed in the first region is possible in a simple manner. If for example significant changes in the test run are marked by means of the markings, then the changes arising respectively in the sequence in the messages can be compared with each other in a simple manner. The use of the corresponding markings thereby allows exactly the same messages to be displayed repeated in the first region.

During a test run, additional items of information relating to the test run can be stored in the storage device, if for example a specific event occurs in the test run, for example, a change of attenuation. When displaying a course of a characteristic feature, then markings are set automatically at the corresponding positions of the diagram. Critical points in the stored chronological sequence of messages can easily be found on the basis of the automatically set markings displayed in the second region, and the respective detailed items of information, upon selection of the automatically set markings, can be read in from the storage device by means of the selector. By means of targeted location of a specific sequence of messages for which the detailed items of information are read in by means of the selector, respectively only a small part of the large quantity of data, which is stored in the storage device relating to the entirety of messages, is read in. The required quantity of data to be loaded is hence considerably reduced, as a result of which an improvement in the user friendliness of the message analyzer is achieved.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

An exemplary embodiment of the method according to the invention and of the message analyzer according to the invention are displayed in the drawings and are explained in more detail in the subsequent description. There are shown:

FIG. 3 depicts a first example of a display on a display device of a message analyzer consistent with the invention.

DETAILED DESCRIPTION OF THE PREFERRED EMBODIMENT

Figure 1:
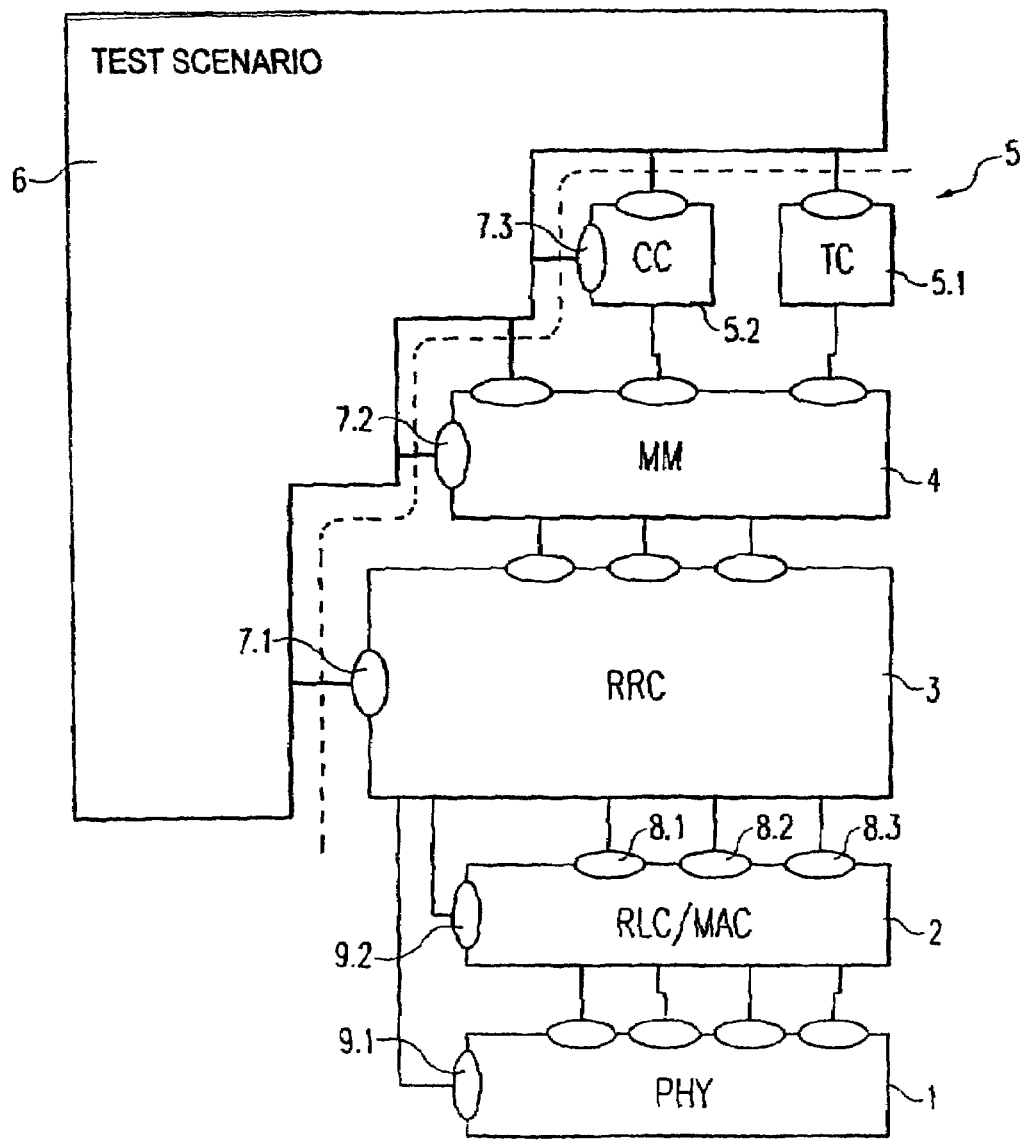
FIG. 1 depicts a display by way of example of an OSI reference model in a test scenario.

As an introduction, an example of an Open Systems Interconnection (OSI) reference model with a test scenario, as is used for example during testing of new software components for mobile telephone system, is intended to be explained briefly, with reference to the schematic representation of FIG. 1, for better understanding of the invention. The OSI reference model is represented simplified in FIG. 1 and comprises five layers, which for example represent an end system of a subscriber of a mobile telephone system. The first layer is a bit transmission layer 1 ("physical layer"; PHY) which reflects the actual transmission of physical items of information, i.e. the bitwise transmission for example of useful data.

Above the bit transmission layer 1 a second layer 2 is disposed ("radio link control"; RLC/"media access control"; MAC), which is followed by a third layer 3 ("radio resource control"; RRC), a fourth layer 4 ("mobility management"; MM) and a fifth layer 5 ("test control" 5.1; TC/"call control" 5.2; CC) which forms the application layer and hence the interface for use by the mobile telephone subscriber or by the test apparatus in the represented embodiment.

In order to control a test run, a test scenario 6 is employed upon the described OSI reference model, which test scenario communicates with different layers of the OSI reference model via the respective service access points thereof. In addition to the service access points, which are disposed in a horizontal plane i.e. between the layers, the test scenario 6 communicates with specific layers via control service access points, which are represented in FIG. 1 as vertically orientated ovals and designated with the reference numbers 7.1, 7.2 and 7.3. Via these control service access points 7.1 to 7.3, parameters of the respective protocol of the layer can be prescribed by the test scenario 6, which is a predetermined run which is prescribed by a protocol tester, for the relevant third, fourth or fifth layer 3, 4 or 5, and hence can be altered in a targeted manner during a test run.

The individual layers of the OSI reference model communicate by transmission of messages to each other, the messages being transmitted respectively via service access points from one layer to another. Also during transmission of messages, differentiation can take place between those service access points which are represented in FIG. 1 as horizontally disposed ovals, as for example are the service access points of the second layer 8.1, 8.2 and 8.3. The additionally present vertically displayed service access points, for example the service access point 9.1 of the bit transmission layer 1 and the service access point 9.2 of the second layer 2 serve in turn to transfer parameters which in this case however do not stem from the external test scenario 6, but rather from another layer of the OSI reference model.

Figure 2:
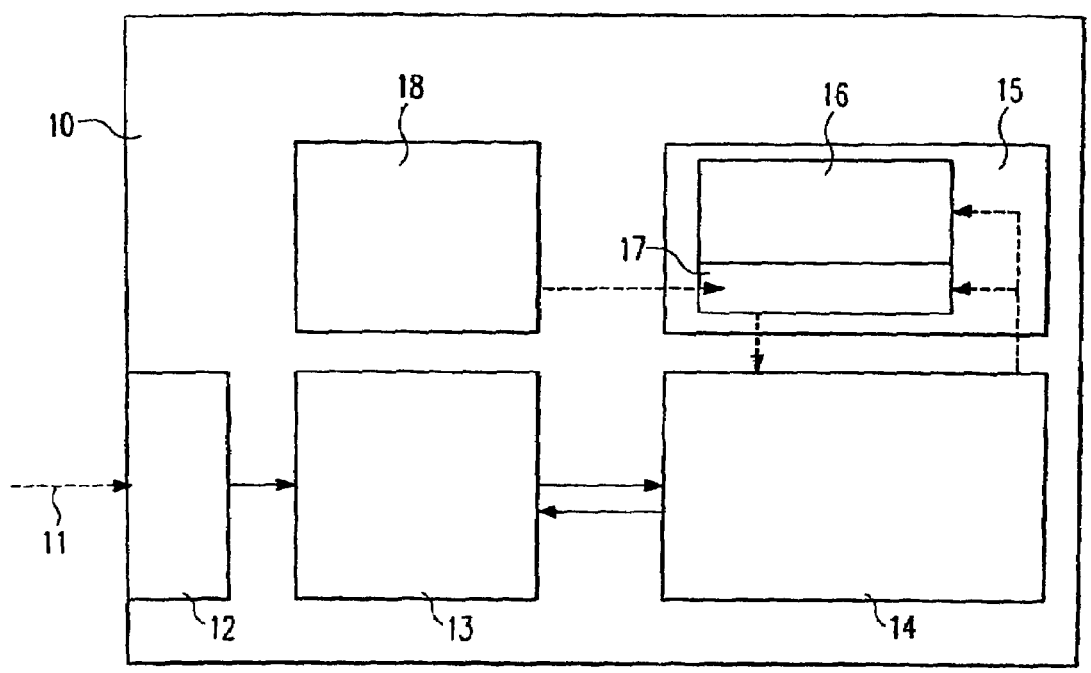
FIG. 2 depicts a schematic representation of an embodiment of a message analyzer consistent with the invention.

During a test run, the messages which are transmitted via the service access points of the layers of the OSI reference model are stored in a file in a storage device of the message analyzer. The messages are stored in this so-called "log file" with a multiplicity of items of information, such as for example the origin of the message, the respective service access point via which the message was transmitted, the transmission time, etc. For this purpose, a connection 11 is provided as is shown in the case of the message analyzer 10 which is represented schematically in FIG. 2.

Via the connection 11, the messages are stored in chronological sequence via an interface 12 in the storage device 13 as a file. Access to the messages stored in the storage device 13 is by means of a selector 14. By means of the selector 14, for example a part of the messages with all the information which is present in the storage device 13 relating to the message can thereby be read in or else, for a specific criterion, all those messages which fulfill this criterion can be selected. For these messages, for example a specific characteristic feature is then determined by means of the selector 14, for this purpose the corresponding storage region of the storage device 13 being accessed in a targeted manner by means of the selector 14, without requiring all the features of the messages to be read in by means of the selector 14 from the storage device 13.

Merely a part of the information stored there relating to the individual messages is singled out selectively from the storage device 13 by means of the selector 14. The quantity of items of information to be read in is hence reduced. Correspondingly, the loading times for the data to be evaluated are reduced. The selector 14 is connected to a display device 15, the display device 15 having, for example within a window displayed thereon, a first region 16 and a second region 17.

If for example a sequence of messages with its entire information content is read in by means of the selector 14, all this information can be displayed in the first region 16 of the selector 14, for which purpose for example a limited number of messages, i.e. a sequence of messages, is displayed in the first region 16 of the display device 15 chronologically in table form. In addition to the real time, at which each message was transmitted, further items of information which describe the message in more detail with respect to the content can be displayed in the table.

In the second region 17, on the other hand, for a large number of messages which are selected according to a criterion which can be established by the user, merely a small part of the items of information is displayed.

Examples of such a display are explained in detail subsequently with reference to FIGS. 3 to 5.

Whilst, in the first region 16, messages which were transmitted via any service access points are displayed in chronological sequence, in order to display a course of a characteristic feature of a group of messages, messages transmitted respectively only via specific service access points, in particular via one specific service access point, are evaluated and, from one criterion respectively of each of these messages, a characteristic feature is determined by means of the selector 14.

After, for example, a specific service access point and a characteristic feature have been established by a user, that item of information respectively of the messages which has a relationship with the characteristic feature is read in by means of the selector 14 from the storage device 13. Reading in of these items of information of the messages is effected selectively in this example only for those messages which have been transmitted via the service access point established by the user. As a simple example, it can be determined by the selector 14, how many messages have been transmitted via a specific service access point per unit of time. In this example, the number of messages per unit of time is the characteristic feature, in addition a specific or a plurality of specific service access points being able to be selected by a user. By means of the selector 14, from the entirety of the messages of all service access points stored in the storage device 13, that group of messages which was transmitted via the service access point (s) established by the user can then be singled out. From the respective real time, it is determined for these service access points how many messages per unit of time were transmitted.

In the second region 17 of the display device 15, the characteristic feature, for instance a number of messages per unit of time in the indicated example, is then plotted via a basic scale. In the second region 17, hence a graphic display relating to a characteristic feature for specific messages is given, which permits a speedy selection to be made from a large period of time which is scanned during the test run. For this purpose, in the course which is displayed in the second region 17 of the display device 15, a selection must be made with a selection means 18 by clicking on a specific point of the displayed course, for example with a computer mouse as selection means 18.

After such a selection of a specific point of the course which is displayed in the second region 17, a sequence of messages which corresponds to this specific point is read in by means of the selector 14 from the storage device 13, preferably all the available information relating to this sequence of messages being read in from the storage device 13. These items of information relating to the content, which are read in by means of selection of a specific point in the course in the second region 17 only for a limited sequence of messages, are then displayed in the first region 16 of the display device 15 again in table form.

Figure 3:
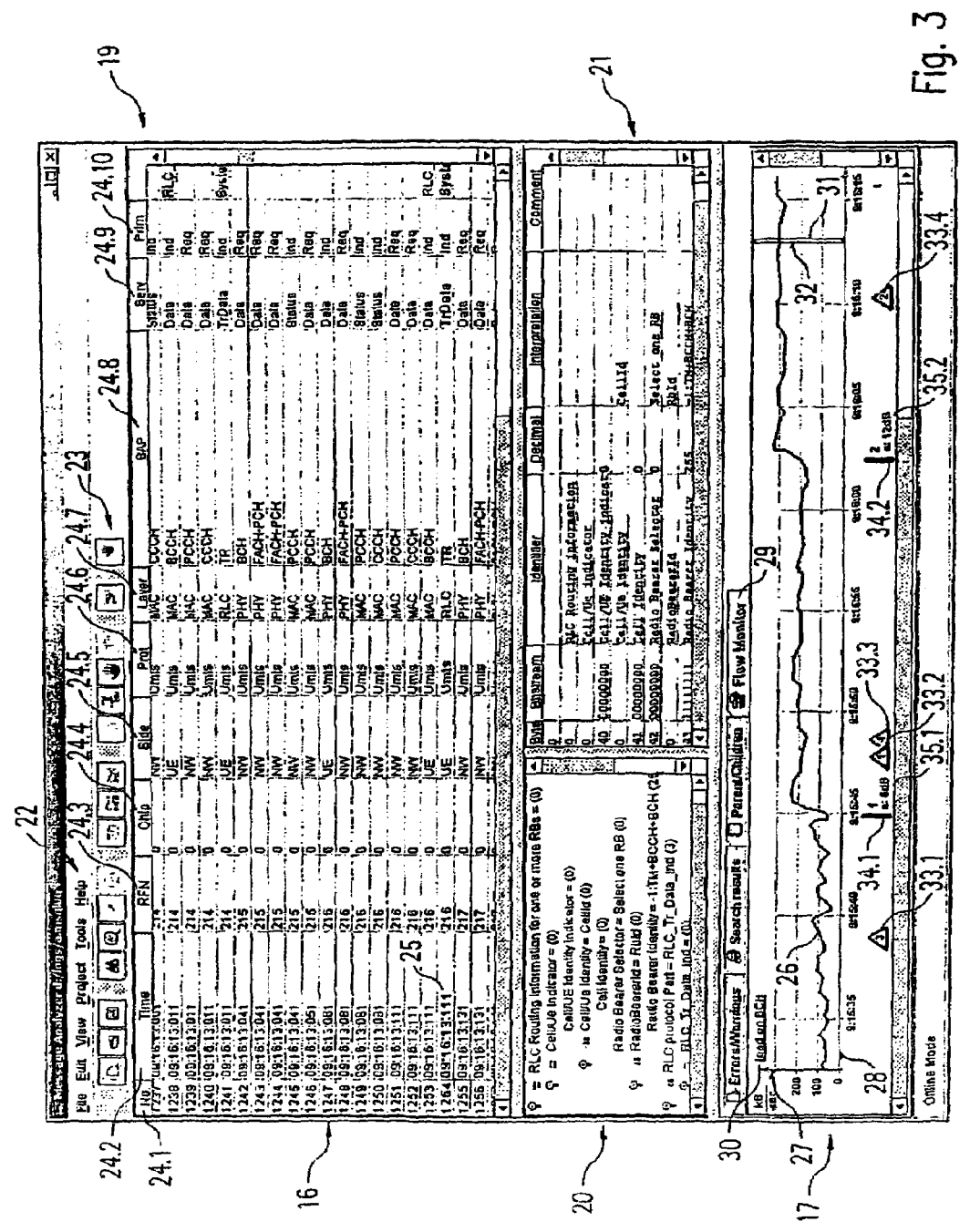

A first view of such a display on a display device 15 is shown in FIG. 3. The display shows a program window 19, in the upper part of which, with horizontal splitting of the program window 19, the first region 16 is disposed and, in the lower part thereof, the second region 17. Between the first region 16 and the second region 17 a third region 20 and a fourth region 21 is configured in the program window 19. The third region 20 and the fourth region 21 serve for displaying for example the structure of a message which is marked in the first region or of additional detailed information relating to the superordinate content-related items of information of an individual message displayed in the table of the first region 16.

In addition to the four regions 16, 17, 20 and 21, the program window 19 shows a menu bar 22 and row of icons 23 as are known from computer programs for other applications. As was already indicated, a sequence of messages is displayed in tabular form in the first region 16, the individual columns 24.1 to 24.10 containing items of information relating to the messages of the sequence. Each entry for a message includes a line in the displayed table.

In the first column 24.1, a serial number of the message is displayed. The second column 24.2 contains a real time at which the message was transmitted whereas, in the third and fourth columns 24.3 and 24.4, a system time to be associated respectively with the message is displayed. The fifth column 24.5 contains data relating to whether the respective message was produced by an end system on the part of the base station or of the mobile telephone subscriber.

In the sixth column 24.6 it is indicated which protocol underlies the message. In the displayed embodiment, the mobile telephone protocol used is Universal Mobile Telecommunications System (UMTS). A seventh column 24.7 indicates from which of the layers according to the OSI reference model the relevant messages were sent. An eighth column 24.8 indicates correspondingly via which service access point the message was transmitted. In addition in FIG. 3 it can be detected that messages are transmitted via a multiplicity of service access points, which messages are temporally successive in so dense a manner that a sequence of messages transmitted via different service access points is displayed in the tabular display of the first region 16.

The selection of which items of information relating to the individual messages should be displayed in the first region 16 can be made by a user in a selection menu, so that for example the explained columns 24.1 to 24.8 and the two further columns 24.9 and 24.10 which relate to the type of transmitted message can be adjusted. With the help of the selection means 18, the user can mark an individual message in the tabular display in the first region 16 which is then displayed in bold or as a message 25 highlighted in color.

In addition to the information content of the message already displayed in the table of the first region 16, there is then displayed in the third region 20 the structure of this individual highlighted message 25 relating to the highlighted message 25. The hierarchical structure is then reproduced in the third region 20 by indentation. In the fourth region 21, detailed items of information relating to the value of the highlighted message 25 of the first region 16 are displayed, the bitwise display of the individual structural elements of the message here being in the foreground.

In contrast to the individual item of detailed information relating to an individual message, which is displayed in the three regions 16, 20 and 21, in the second region 17 a course 26 of a characteristic feature for a multiplicity of messages, which are related to each other, is displayed. In the represented embodiment, a data load is displayed for example on the y axis 27, i.e. the quantity of data transmitted per unit of time via a specific service access point. The chosen unit in the represented embodiment is kilobytes per second and relates to a service access point designated by BCH ("Broadcast Channel"), as is displayed in a legend 30 in the second region 17.

The entry in the legend 30 and the course 26, which is displayed in the second region 17, can be coordinated in color, for example, so that a plurality of courses can also be displayed in the second region 17, nevertheless an unequivocal association being possible. The prerequisite for display of a plurality of courses in the second region 17 is that, as a characteristic feature which is plotted on a y axis 27, the same variable is used and that in addition the reference variable of the basic scale on an x axis 28 is identical. For the course 26 represented in FIG. 3, the real time underlies the basic scale for the x axis 28.

The second region 17 within the program window 19 is provided, in addition to use for displaying the course 26, also for displaying other items of information. For this purpose, register cards are provided in the second region 17, which can be brought via corresponding index tabs 29 in the foreground.

The sequence of messages, which is listed in the first region 16, relates to the messages within a specific period of time for the real time which is indicated in the second column 24.2. For the time region displayed in the visible table, an associated frame 31 is displayed in the second region 17, with which frame a simple temporal association between the messages listed in the first region 16 and the temporal overall course of the characteristic feature, which is displayed in the second region 17, is possible.

In order to display, in the first region 16 relative to the displayed sequence of messages, another sequence of messages with a temporally different position, another sequence of messages is read in with the associated items of information by means of the selector 14 from the storage device 13. For this purpose, firstly a position of the course 26 is selected with the help of the selection means 18 in the second region 17. As a result, a selection of a specific point 32 is implemented. The specific point 32 thereby relates only to the position on the respectively used basic scale, i.e. in the represented embodiment a specific point in time on the x axis 28 which serves as time axis of the real time.

In addition to the direct determination of a specific point 32 by clicking on a position in the displayed course 26 in the second region 17, it is also possible to set one or more markings 33.1 to 33.4 which establish respectively a specific point, without however already selecting said point. The selection of that specific point, which is to be associated with an individual marking 33.1, 33.2, 33.3 or 33.4, is only effected respectively when the relevant marking for example is selected in turn via the selection means 18. By selecting one of the corresponding markings. 33.1 to 33.4, the specific point associated with the respectively selected marking 33.1 to 33.4 is selected indirectly and as a result the sequence of messages which corresponds to this specific point is displayed in the first region 16. With each selection of a specific point, whether it be directly or indirectly by means of a marking, a corresponding sequence of messages is read in by means of the selector 14 from the storage device 13.

Alternatively, the sequence of messages displayed in the first region 16 can be displaced also by activation of a scroll bar, the frame 31 displayed in the second region 17 being displayed correspondingly displaced.

During production of the graphical output for the course 26 in the second region 17 based on additional items of information which define for example specific points in time of the real time in the storage device 13, also further markings 34.1 and 34.2 can be set automatically. With the help of these further markings 34.1 and 34.2 it is possible to locate specific sequences of messages in a simplified manner, which are of particular interest during evaluation. For example an additional item of information respectively can be stored by means of the test scenario 6 in the storage device 13 relating to those points in time at which attenuation changes during implementation of the test, as is represented for the two automatically set markings 34.1 and 34.2 in FIG. 3.

Just as the markings 33.1 to 33.4, the automatically set markings 34.1 and 34.2 can be selected by means of the selection means 18, and hence a sequence of messages can be read in by means of the selector 14 and displayed in the first region 16, for which sequence changed behavior due to a jump during attenuation is expected.

In the second region 17, a short item of data 35.1 or 35.2 preferably relating to the further markings 34.1 and 34.2 is displayed, which item of data indicates the cause for the entry of the additional item of information in the storage device 13.

In addition, it is advantageous to display the markings 33.1 to 33.4, which are manually set by a user, and the further markings 34.1 and 34.2 in a visually differentiable manner.

Figure 4:
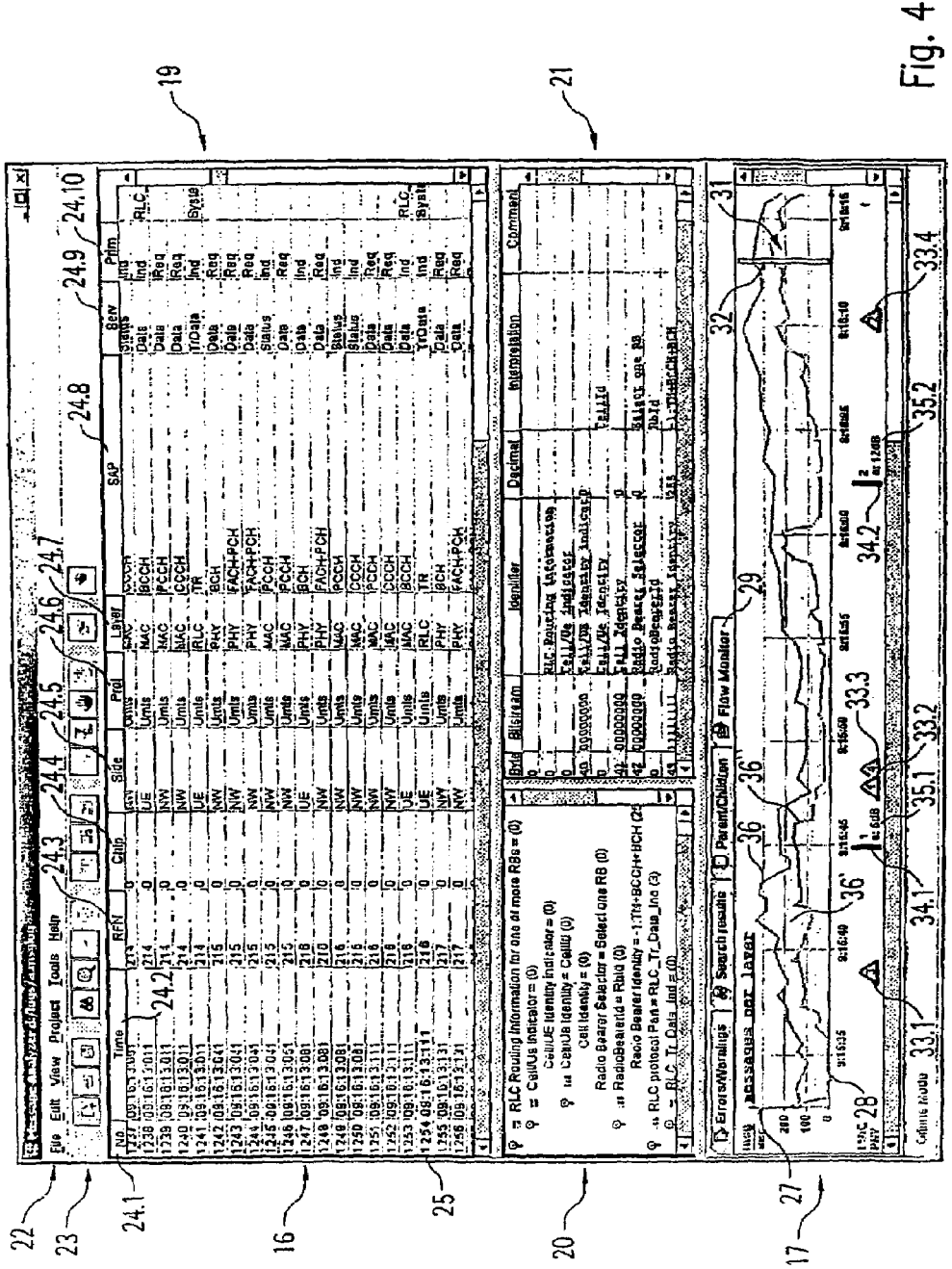
FIG. 4 depicts a second example of a display on a display device of a message analyzer consistent with the invention.
Figure 5:
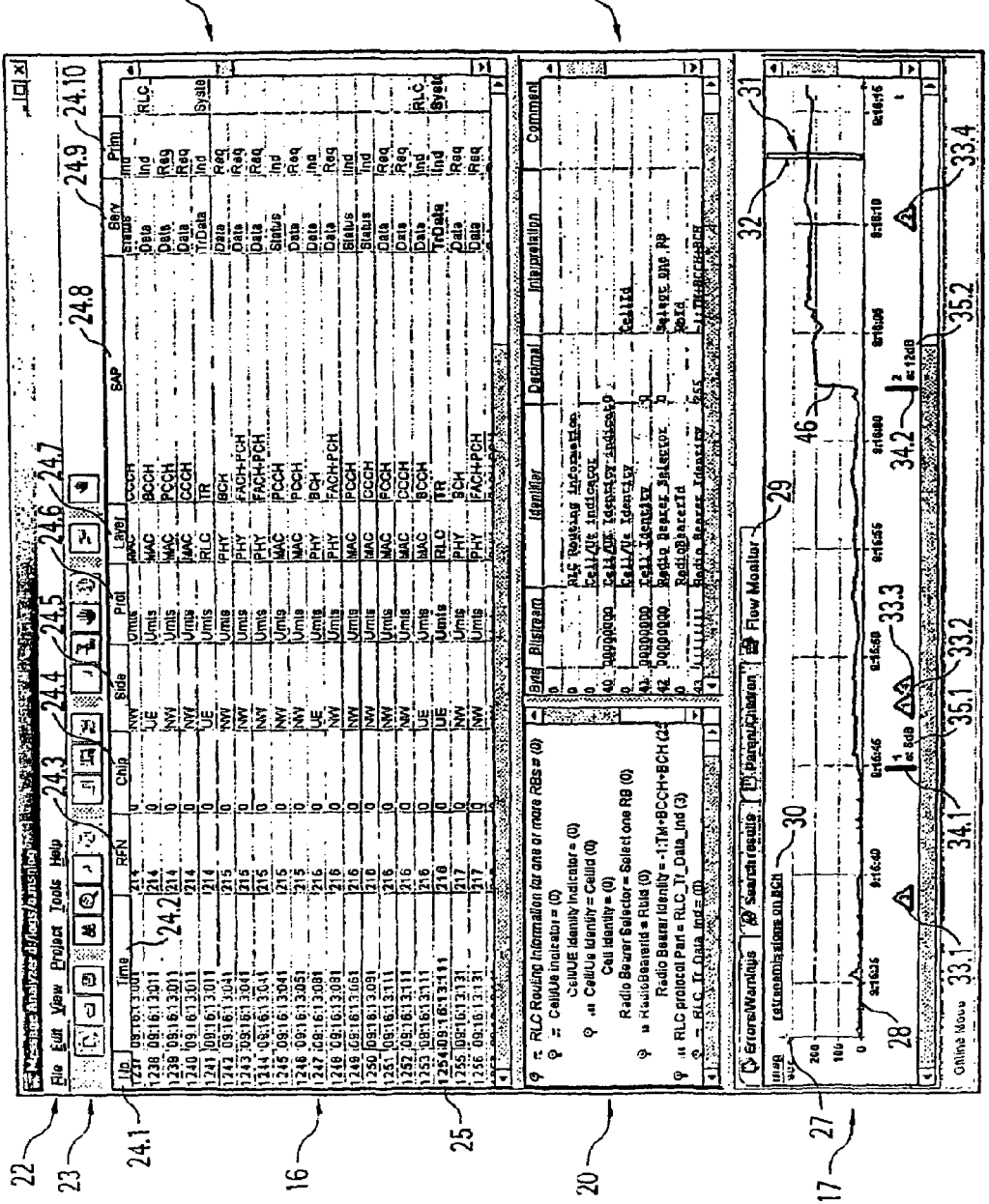
FIG. 5 depicts a third example of a display on a display device of a message analyzer consistent with the invention.

A further possible representation of a program window 19 is shown in FIG. 4, in which window in total three courses 36, 36' and 36" are displayed in the second region 17. The x axis 28 is again the time axis for real time. Instead of the data load, the number of messages for a plurality of layers of the OSI reference model per unit of time is plotted on the y axis 27, in contrast to the previous embodiment of FIG. 3. Information from the messages of all the service access points of one layer of the OSI reference model is thereby processed by the selector 14, in order to determine a common characteristic feature of the entire layer.

The number of messages transmitted via all the service access points of a specific layer of the OSI reference model is compiled as a sequence and displayed as a corresponding course 36, 36' or 36". Since the individual messages are arranged in tabular form in the first region 16 merely on the basis of real time, in the first region 16 of the embodiment of FIG. 4, the same messages can be detected as in the embodiment of FIG. 3, since in the altered representation of the second region 17 of FIG. 4, again no specific point deviating from the specific point 32 in FIG. 3 was chosen. The position of the frame 31, with which the sequence of messages displayed in the first region 16 is reproduced as a time span in the second region 17, therefore corresponds to the frame 31, as is shown in FIG. 3 in the second region 17.

Between the respective displays in the second region 17, as is shown in FIG. 3 or FIG. 4, a selection menu can be selected for example by an operator, without the items of information displayed in the remaining regions 16, 20 and 21 being changed, as long as the selection of the specific point 32 in the second region 17 is not changed, and hence a new sequence of messages from the storage device 13 is read in by means of the selector 14. In the third embodiment in FIG. 5, the number of repeatedly transmitted messages of a specific layer of the OSI reference model is displayed as course 46 again via the real time as x axis 28 instead of the data load from FIG. 3 as characteristic feature. Correspondingly, the unit of the y axis 27 is now the number of messages per time interval. The meaning of the further markings 34.1 and 34.2 is in particular readily detectable, since a rapid increase in the number of renewed transmissions of messages of the displayed layer of the OSI reference model is linked to the second step of increasing the attenuation of the signal in the case of the further marking 34.2.

In the displays of the second region chosen for explanation, the real time was selected respectively as basic scale of the x axis 28. Instead of a pure time axis however, likewise the x axis 28 can be subdivided into intervals of identical width, a specific number of transmitted messages standing for each interval. Hence it can readily be read off in the course, for example, how the total number of transmitted messages are distributed on the individual layers of the OSI reference model. An unnecessary spread of the x axis 28 with the real time in the periods of time in which in total only a small number of messages is transmitted can be dispensed with, as a result of which a particularly clear display is achieved. The respective interval width is thereby preferably adjustable by an operator for example by means of a selection menu.

Instead of real time as basic scale for an x axis 28 configured as time axis, also a system time can be used, such as for example a specific number of transmitted frames (RFN; "Radio Frame Number") per interval or transmitted chips per interval.

The invention is not restricted to the described embodiments. The features of the embodiments can also be combined together in an arbitrary manner.

While the present invention has been described in connection with a number of embodiments and implementations, the present invention is not so limited but covers various obvious modifications and equivalent arrangements, which fall within the purview of the appended claims.

The is claimed is:

1. A message analyzer for analyzing messages which are transmitted via at least one service access point from layers of an Open Systems Interconnection (OSI) reference model of an end system of a subscriber of a mobile telephone system, the message analyzer comprising:
    a storage device for storing messages;
    a selector for reading in a first sequence of messages,
    wherein the first sequence of messages is a sequence of temporally successive messages; and
    a display device for displaying, on a single screen, a first region and a second region, wherein the first sequence of messages is read in by the selector from the storage device and displayed in the first region,
    wherein the selector determines, for the at least one service access point, a first characteristic feature of the messages which are transmitted via the at least one service access point and a course of the first characteristic feature is displayed on the display device in the second region,
    wherein the selector reads a second sequence of messages dependent upon a selection of a specific point of the course of the first characteristic feature that is selectable in the second region, and
    wherein the display device is configured to display a selectable marking produced automatically by the selector in the second region based on a predefined additional item of information stored during storing the messages in the storage device, and
    wherein upon selection of the marking, the second sequence of messages which corresponds to the specific point of the selected marking is read in from the storage device.

2. A message analyzer according to claim 1, wherein the selector determines a second characteristic feature for messages which are transmitted via a plurality of service access points of a layer of the OSI reference model, and a course of the second characteristic feature is displayed on the display device in the second region.

3. A message analyzer according to claim 1, wherein the course of the first characteristic feature is displayed in the second region in a coordinate system, wherein the X axis of the coordinate system is a time axis.

4. A message analyzer according to claim 3, wherein a third region of the course displayed in the second region which corresponds respectively to the first sequence of messages currently displayed in the first region, is highlighted.

5. A message analyzer according to claim 1, wherein the course of the first characteristic feature is displayed in the second region in a coordinate system, wherein the X axis of the coordinate system is subdivided into intervals each having an identical number of messages.

6. A message analyzer according to claim 1, wherein the first characteristic feature is a number of transmitted messages per interval of time or a data load of a layer of the OSI reference model or a number of messages transmitted repeatedly.

7. A message analyzer according to claim 1, wherein the predefined additional item of information is defined as a specific event that occurs during a test run.

8. A message analyzer according to claim 7, wherein the specific event is a change of attenuation.

9. A message analyzer for analyzing messages which are transmitted via at least one service access point from layers of an Open Systems Interconnection (OSI) reference model of an end system of a subscriber of a mobile telephone system, the message analyzer comprising:
    a storage device for storing messages;
    a selector for reading in a first sequence of messages,
    wherein the first sequence of messages is a sequence of temporally successive messages; and
    a display device for displaying, on a single screen, a first region and a second region,
    wherein the first sequence of messages is read in by the selector from the storage device and displayed in the first region,
    wherein the selector determines, for the at least one service access point, a first characteristic feature of the messages which are transmitted via the at least one service access point and a course of the first characteristic feature is displayed on the display device in the second region,
    wherein the selector reads a second sequence of messages dependent upon a selection of a specific point of the course of the first characteristic feature that is selectable in the second region, and
    wherein a plurality of specific points are marked by respective markings in the course displayed in the second region and, upon selection of a marking of the markings, the second sequence of messages which corresponds to the specific point of the selected marking is read in from the storage device.

10. A method using a computer or a digital signal processor for analyzing messages which are transmitted via at least one service access point from layers of an OSI reference model of an end system of a subscriber of a mobile telephone system and which are stored in a storage device, comprising the steps of:
    reading in a first sequence of messages by a selector;
    displaying the first sequence of messages which is read in by the selector, in tabular form in a first region of a single screen of a display device,
    wherein a first characteristic feature of messages which are transmitted via the at least one service access point is determined by the selector and a course of the first characteristic feature is displayed in a second region of the single screen of the display device;
    selecting, in the second region, a specific point of the course of the first characteristic feature; and
    reading in, by the selector, a second sequence of messages dependent upon the specific point,
    wherein during storing the messages in the storage device, a predefined additional item of information is stored, and dependent upon the predefined additional item of information, a selectable marking is produced automatically in the second region by the selector, and upon selection of the marking, dependent upon the specific point marked by the selected marking, the second sequence of messages which corresponds to the specific point of the selected marking is read in by the selector from the storage device.

11. A method according to claim 10, further comprising: determining, by the selector, a second characteristic feature of messages which are transmitted via a plurality of service access points of a layer of the OSI reference model.

12. A method according to claim 10, wherein at least one characteristic feature is displayed in the second region in a coordinate system, wherein the X axis of the coordinate system is a time axis.

13. A method according to claim 12, wherein a third region which corresponds respectively to the first sequence of messages displayed in tabular form in the first region is displayed highlighted in the second region.

14. A method according to claim 10, wherein the first characteristic feature is displayed in the second region in a coordinate system, wherein the X axis of the coordinate system is sub-divided into intervals each having an identical number of messages.

15. A method according to claim 10, wherein the predefined additional item of information is defined as a specific event that occurs during a test run.

16. A method according to claim 15, wherein the specific event is a change of attenuation.

17. A method using a computer or a digital signal processor for analyzing messages which are transmitted via at least one service access point from layers of an OSI reference model of an end system of a subscriber of a mobile telephone system and which are stored in a storage device, comprising the steps of:

reading in a first sequence of messages by a selector;

displaying the first sequence of messages which is read in by the selector, in tabular form in a first region of a single screen of a display device, wherein a first characteristic feature of messages which are transmitted via the at least one service access point is determined by the selector and a course of the first characteristic feature is displayed in a second region of the single screen of the display device;

selecting, in the second region, a specific point of the course of the first characteristic feature; and reading in, by the selector, a second sequence of messages dependent upon the specific point, wherein in the second region, a plurality of specific points of the course of the first characteristic feature are marked by respective markings, and upon selection of a marking of the markings, dependent upon the specific point marked by the selected marking, the second sequence of messages which corresponds to the specific point of the selected marking is read in by the selector from the storage device.

\* \* \* \* \*